(12) United States Patent
Tsuruoka

(10) Patent No.: US 7,570,287 B2
(45) Date of Patent: Aug. 4, 2009

(54) IMAGE PICKUP SYSTEM FOR NOISE ESTIMATING AND NOISE REDUCTION

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 763 days.

(21) Appl. No.: 10/630,438

(22) Filed: Jul. 30, 2003

(65) Prior Publication Data

US 2004/0027469 A1 Feb. 12, 2004

(30) Foreign Application Priority Data

Aug. 6, 2002 (JP) ............................. 2002-229059

(51) Int. Cl.
H04N 5/217 (2006.01)
G06K 9/38 (2006.01)

(52) U.S. Cl. ....................................... 348/241; 382/270

(58) Field of Classification Search ................ 348/241, 348/243, 245, 246; 382/254, 260, 270–273
See application file for complete search history.

(56) References Cited

U.S. PATENT DOCUMENTS

| | | | | |
|---|---|---|---|---|
| 5,047,861 A | * | 9/1991 | Houchin et al. | 348/247 |
| 5,563,962 A | * | 10/1996 | Peters et al. | 382/261 |
| 6,144,408 A | * | 11/2000 | MacLean | 348/241 |
| 6,249,647 B1 | * | 6/2001 | Cazier et al. | 396/97 |
| 6,714,241 B2 | * | 3/2004 | Baer | 348/241 |
| 6,927,795 B1 | * | 8/2005 | Cazier et al. | 348/243 |
| 6,965,395 B1 | * | 11/2005 | Neter | 348/129 |
| 6,974,973 B2 | * | 12/2005 | Rossi et al. | 257/72 |
| 6,980,335 B2 | * | 12/2005 | Kubo | 358/518 |
| 7,064,785 B2 | * | 6/2006 | Prentice et al. | 348/243 |
| 7,102,672 B1 | * | 9/2006 | Jacobs | 348/243 |
| 7,102,673 B2 | * | 9/2006 | Kimura | 348/246 |
| 7,113,210 B2 | * | 9/2006 | Bloom | 348/243 |
| 7,133,072 B2 | * | 11/2006 | Harada | 348/243 |
| 2002/0008766 A1 | * | 1/2002 | Tariki | 348/243 |
| 2002/0012053 A1 | * | 1/2002 | Yoshida | 348/243 |
| 2003/0128285 A1 | * | 7/2003 | Itoh | 348/246 |
| 2003/0214590 A1 | * | 11/2003 | Matherson | 348/243 |

FOREIGN PATENT DOCUMENTS

| | | | |
|---|---|---|---|
| CN | 1292621 A | | 4/2001 |
| EP | 1 289 309 | | 3/2003 |
| JP | 63046077 A | * | 2/1988 |
| JP | 11317516 A | * | 11/1999 |
| JP | 2000-023173 | | 1/2000 |
| JP | 2001157057 | | 6/2001 |
| JP | 2002057900 | | 2/2002 |
| JP | 2003-153290 | | 5/2003 |
| JP | 2000-341559 | | 8/2008 |

* cited by examiner

*Primary Examiner*—Timothy J Henn
(74) *Attorney, Agent, or Firm*—Volpe and Koenig, P.C.

(57) ABSTRACT

In the image pickup system of the present invention, factors that have an effect on noise such as the signal level, temperature of the CCD during shooting, exposure time, gain and the like are dynamically acquired, the noise level of the CCD is estimated, for example, for each pixel by a noise estimating unit, and signal components equal to or less than this noise level in the video signals are suppressed by a noise reducing unit, so that a high-quality image that is substantially free of noise is obtained while preserving the edges of the image and the like.

23 Claims, 10 Drawing Sheets

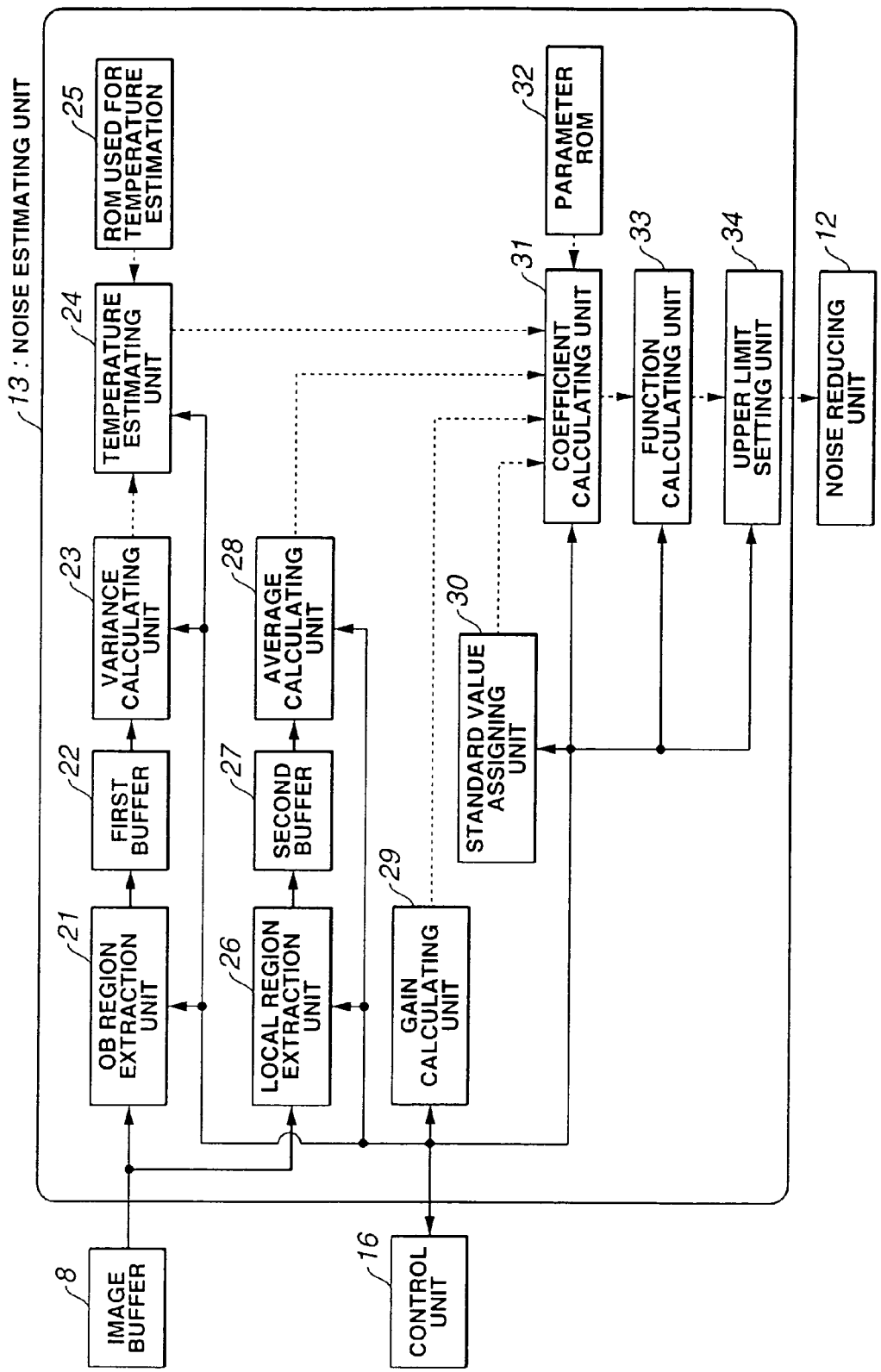

FIG.3A
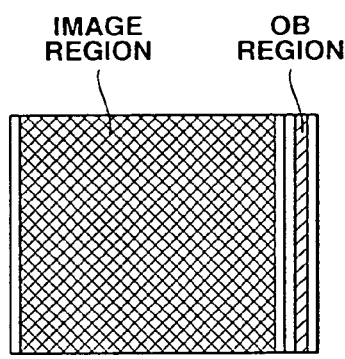
FIG.3B
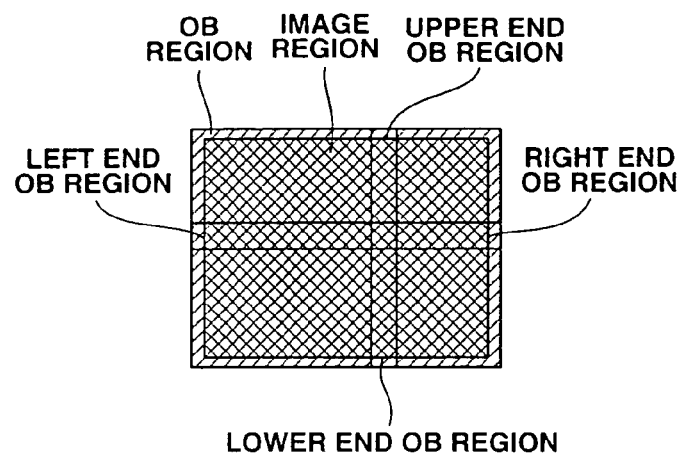
FIG.4
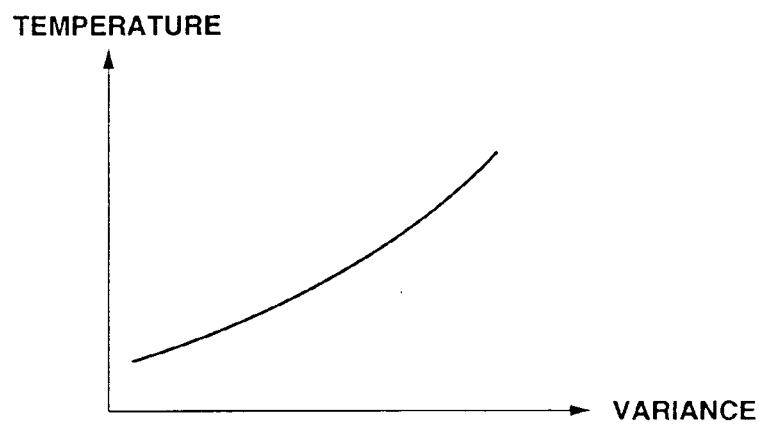
FIG.9
| R | G1 |
|---|----|
| G2 | B |

FIG.6A  FIG.6B  FIG.6C
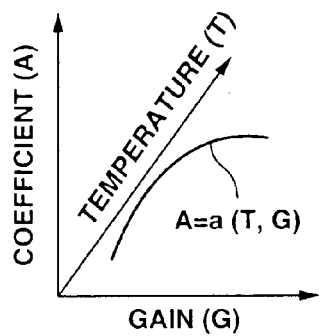 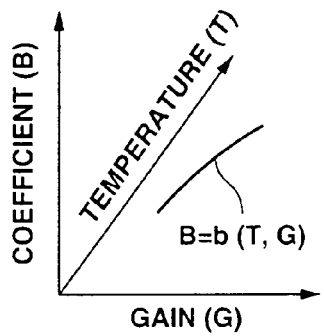 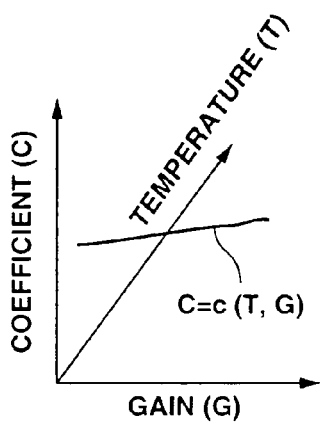
FIG.6D
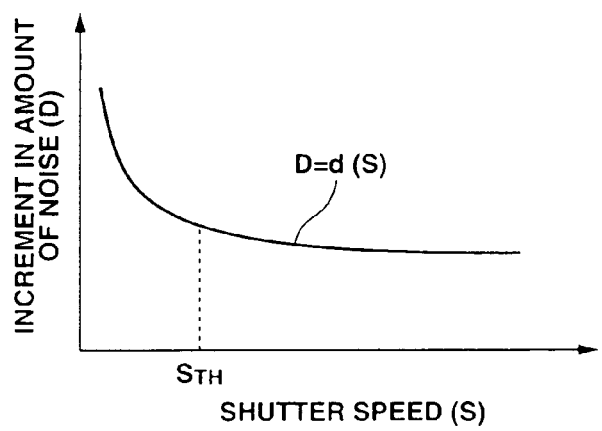

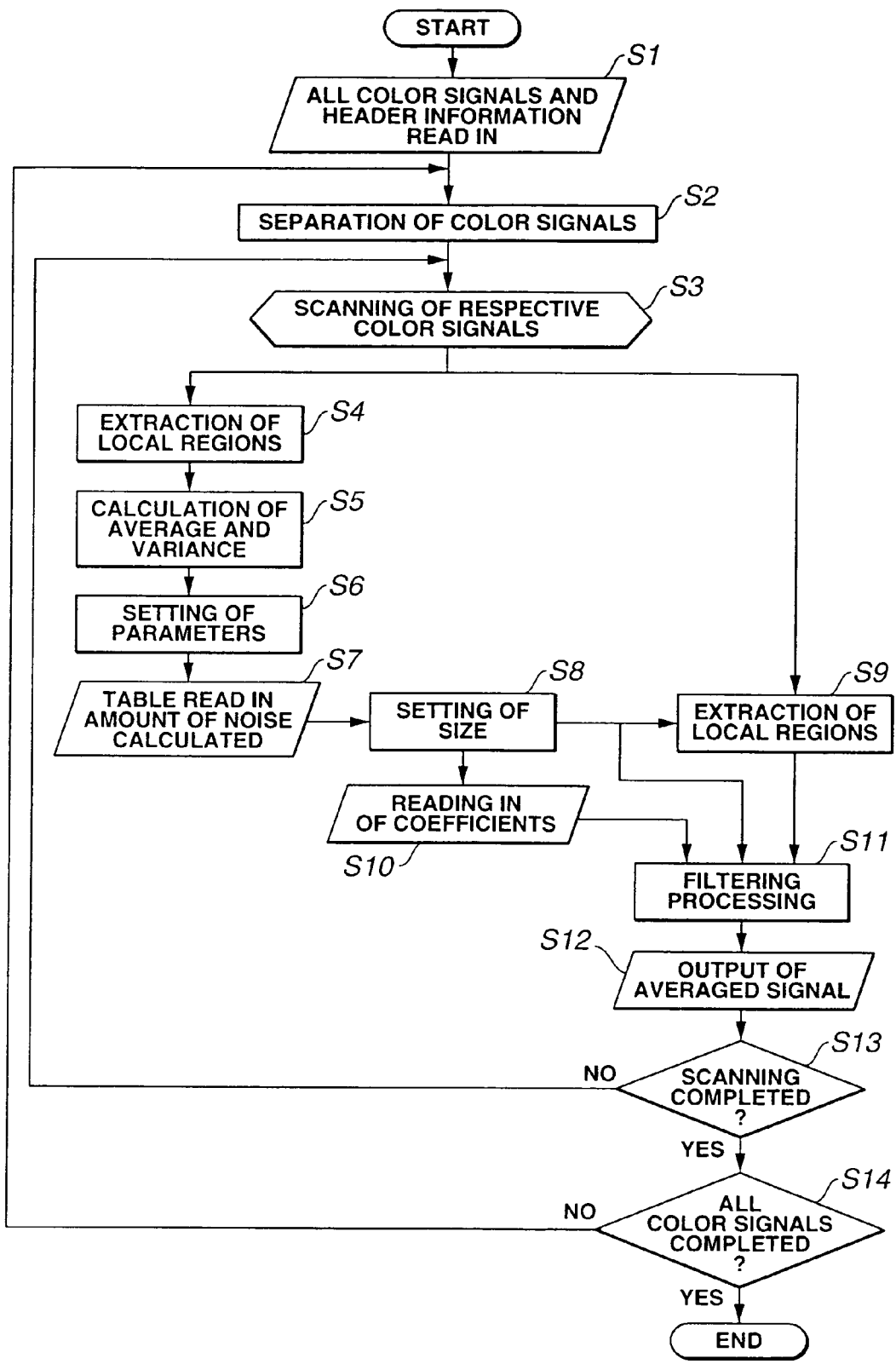

IMAGE PICKUP SYSTEM FOR NOISE ESTIMATING AND NOISE REDUCTION

CROSS-REFERENCE TO RELATED APPLICATION

This application claims benefits of Japanese Application No. 2002-229059 filed in Japan on Aug. 6, 2002, the contents of which are incorporated by this reference.

BACKGROUND OF THE INVENTION

1. Field of the Invention

The present invention relates to an image pickup system and image processing program which reduce random noise arising in the image pickup element system.

2. Description of the Related Art

Generally, noise components are contained in digitized signals obtained from image pickup elements and the associated analog circuits and A/D converters. Such noise components can be divided into two main categories, i.e., fixed pattern noise and random noise.

The abovementioned fixed pattern noise is noise that originates mainly in the image pickup elements, as typified by defective pixels or the like.

On the other hand, random noise is generated in the image pickup elements and analog circuits, and has characteristics that are close to white noise characteristics.

In regard to the latter random noise, for example, a technique in which the amount of noise N is converted into a function by $N = ab^{cD}$ using constant terms a, b and c that are statically given as constant terms, and the signal level D converted into a density value, the amount of noise N for the signal level D is estimated from this function, and the filtering frequency characteristics are controlled on the basis of the estimated amount of noise N, is disclosed in Japanese Patent Application Laid-Open No. 2001-157057. Using this technique, an appropriate noise reduction treatment can be performed on the signal level.

Furthermore, as another example, Japanese Patent Application Laid-Open No. 2002-57900 discloses a technique in which the difference value $\Delta$ between a pixel of interest and a nearby pixel is determined, then, the mean pixel number n used in the moving average method is controlled by the function $n = a/(\Delta + b)$ using the determined difference value $\Delta$ and constant terms a and b that are statically given as constant terms, and a moving average is not determined in cases where the determined difference value $\Delta$ is equal to or greater than a specified threshold value. By using such a technique, it is possible to perform a noise reduction treatment without causing any deterioration of the original signal such as edges or the like.

However, since the amount of noise varies dynamically according to factors such as the temperature at the time of shooting, exposure time, gain and the like, conversion to a function that matches the amount of noise during shooting cannot be handled in the case of a technique using static constant terms such as that described in the abovementioned Japanese Patent Application Laid-Open No. 2001-157057, so that the precision in estimating the amount of noise is inferior. Furthermore, the filtering frequency characteristics are controlled from the amount of noise; however, since this filtering performs equal processing without discriminating between flat portions and edge portions, the edge portions in regions, where it is estimated on the basis of the signal level that the amount of noise is large, deteriorate. Specifically, processing that discriminates between the original signal and noise cannot be handled, so that the preservation of the original signal is poor.

Furthermore, in the technique described in Japanese Patent Application Laid-Open No. 2002-57900, the determination of whether or not the moving average method is performed is accomplished by comparison with a threshold value. However, since this threshold value is also given statically, variation in the amount of noise according to the signal level cannot be handled, so that the selection of the average number of pixels or moving average method cannot be optimally controlled. Consequently, noise components remain, resulting in deterioration of the original signal and the like.

SUMMARY OF THE INVENTION

In short, the image pickup system comprises a noise estimating unit which estimates the amount of noise contained in the digitized signal from an image pickup element in which a plurality of pixels are arranged, either for each pixel or for each specified unit area comprising a plurality of pixels, and a noise reducing unit which reduces the noise in the abovementioned signal on the basis of the amount of noise estimated by this noise estimating unit.

Additional features and advantages of the invention will be set forth in the description which follows, and in part will be obvious from the description, or may be learned by the practice of the invention. The features and advantages of the invention may be realized and obtained by means of the instrumentalities and combinations particularly pointed out hereinafter.

BRIEF DESCRIPTION OF THE DRAWINGS

FIG. 2 is a block diagram which shows the construction of the noise estimating unit in the abovementioned first embodiment;

FIG. 3A is a diagram which shows an example of the arrangement of the OB regions in the abovementioned first embodiment;

FIG. 3B is another diagram which shows an example of the arrangement of the OB regions in the abovementioned first embodiment;

FIG. 4 is a graph which shows the relationship between the variance of the OB region and the temperature of the image pickup element in the above-mentioned first embodiment;

FIG. 6A is a graph which is used to illustrate parameters used in the formulization of the amount of noise in the abovementioned first embodiment;

FIG. 6B is another graph which is used to illustrate parameters used in the formulization of the amount of noise in the abovementioned first embodiment;

FIG. 6C is another graph which is used to illustrate parameters used in the formulization of the amount of noise in the abovementioned first embodiment;

FIG. 6D is still another graph which is used to illustrate parameters used in the formulization of the amount of noise in the abovementioned first embodiment;

FIG. 9 is a diagram which shows the primary color Bayer type filter construction in the color filters of the abovementioned second embodiment;

FIG. 12 is a flow chart which shows the noise reduction processing that is performed by the image processing program in the computer of the above-mentioned second embodiment.

DESCRIPTION OF THE PREFERRED EMBODIMENTS

Embodiments of the present invention will be described below with reference to the attached figures.

Figure 1:
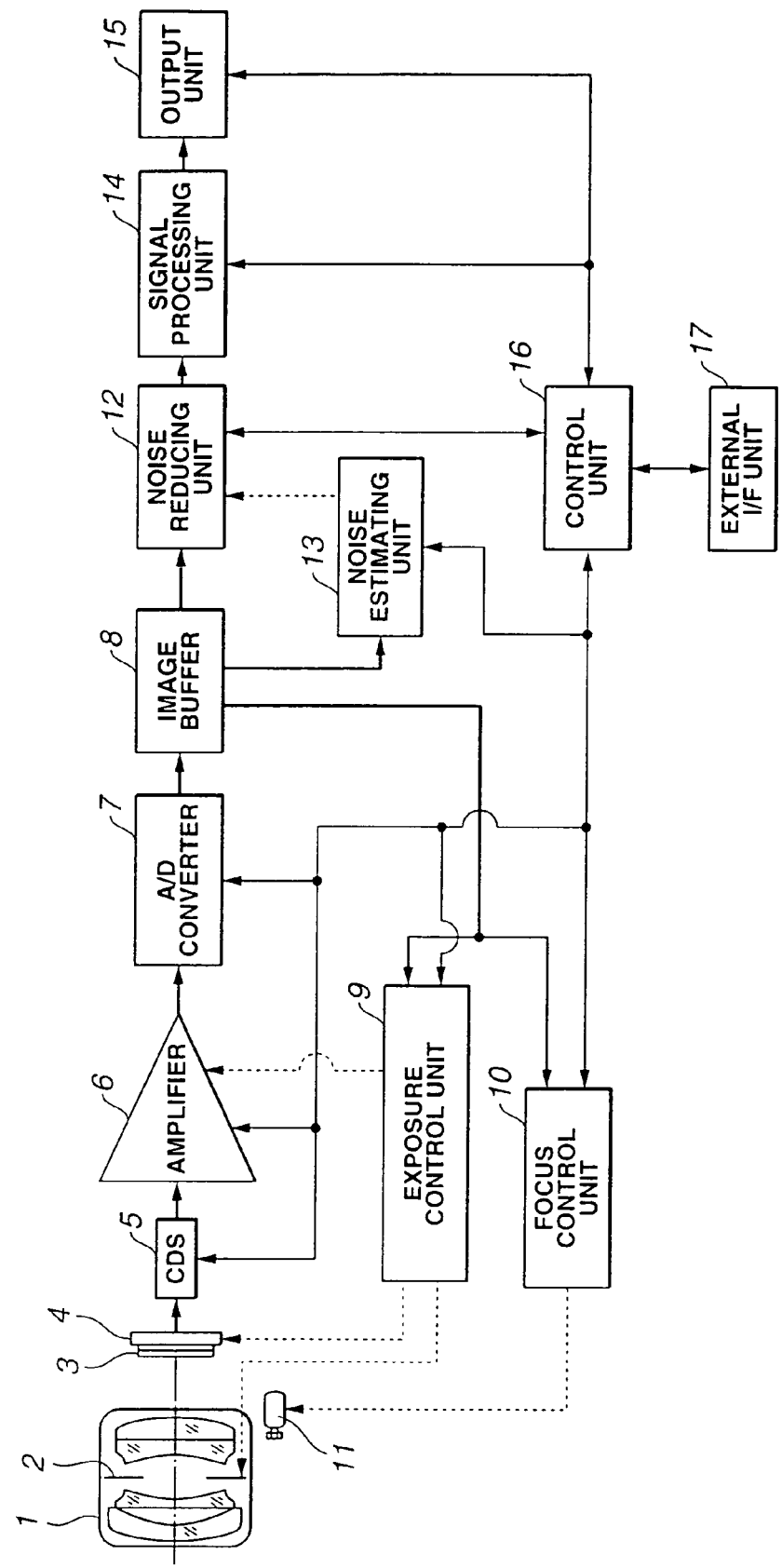
FIG. 1 is a block diagram which shows the construction of the image pickup system in a first embodiment of the present invention.
Figure 7:
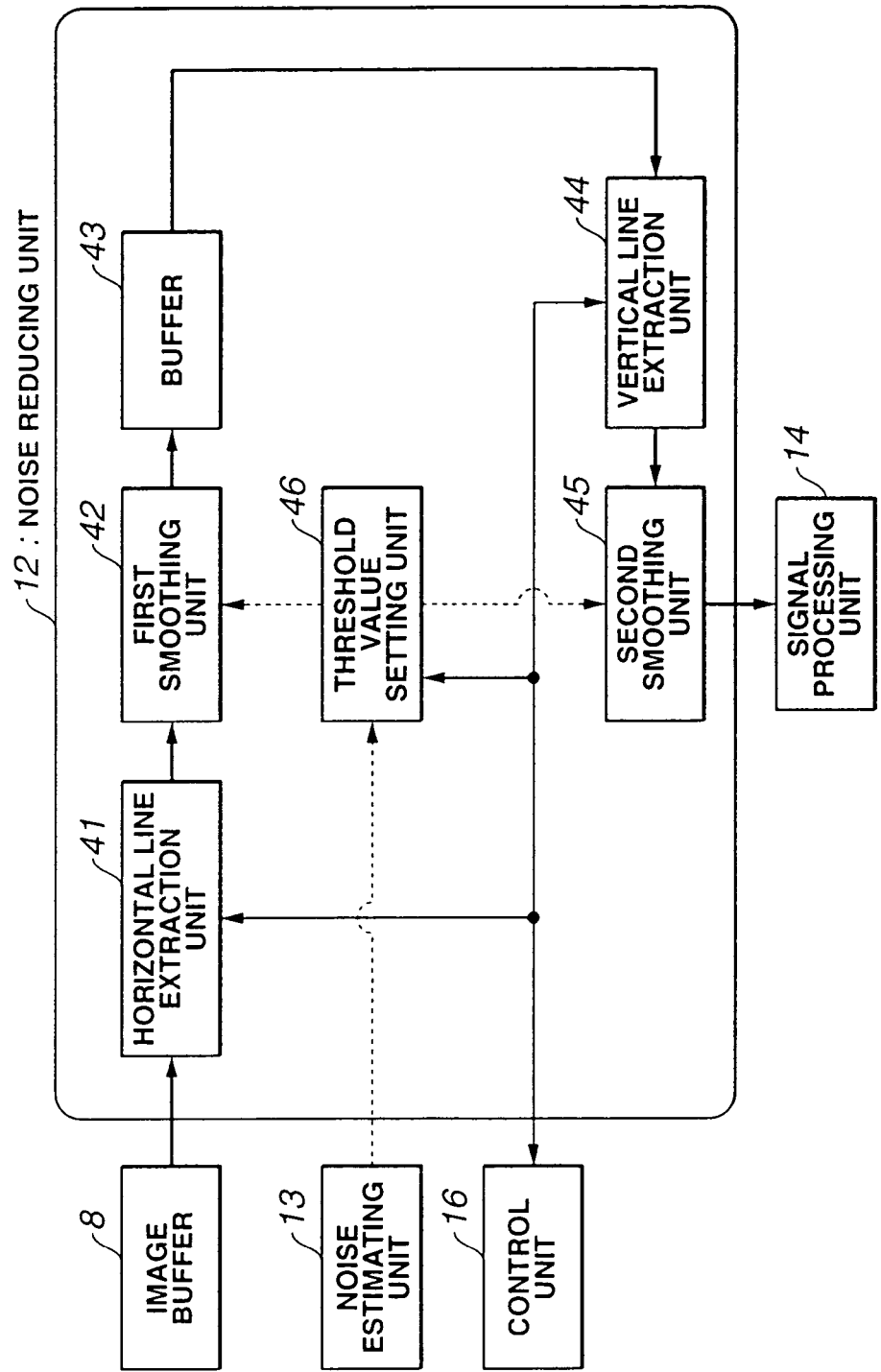
FIG. 7 is a block diagram which shows the construction of the noise reducing unit in the abovementioned first embodiment.

FIGS. 1 through 7 illustrate a first embodiment of the present invention. FIG. 1 is a block diagram which shows the construction of the image pickup system, FIG. 2 is a block diagram which shows the construction of the noise estimating unit, FIGS. 3A and 3B are diagrams which show examples of the arrangement of the OB regions, FIG. 4 is a graph which shows the relationship between the variance of the OB region and the temperature of the image pickup element, FIGS. 5A and 5B are graphs which are used to illustrate the formulization of the amount of noise, FIGS. 6A, 6B, 6C and 6D are graphs which are used to illustrate parameters used in the formulization of the amount of noise, and FIG. 7 is a block diagram which shows the construction of the noise reducing unit.

As is shown in FIG. 1, this image pickup system comprises a lens system 1 which is used to form an image of the subject, an aperture 2 which is arranged inside the lens system 1, and which is used to regulate the range of the luminous flux that passes through the lens system 1, a low-pass filter 3 which is used to eliminate unnecessary high-frequency components from the luminous flux that has been formed into an image by the abovementioned lens system 1, a CCD 4 constituting a black and white image pickup element which subjects the optical image of the subject that is formed via the abovementioned low-pass filter 3 to a photoelectric conversion, and outputs an electrical image signal, a CDS (correlated double sampling) unit 5 which performs correlated double-sampling on the image signal that is output from the abovementioned CCD 4, an amplifier 6 which amplifies the signal that is output from the abovementioned CDS unit 5, an A/D converter 7 which converts the analog image signal amplified by the abovementioned amplifier 6 into a digital signal, an image buffer 8 which temporarily stores the digital image data that is output from the abovementioned A/D converter 7, an exposure control unit 9 which performs light measurement and evaluation relating to the subject on the basis of the image data that is stored in the abovementioned image buffer 8, and which controls the abovementioned aperture 2, CCD 4 and amplifier 6 on the basis of the results of this evaluation, a focus control unit 10 which detects the focal point on the basis of the image data stored in the abovementioned image buffer 8, and which drives an AF motor 11 (described later) on the basis of the results of this detection, the AF motor 11 which is controlled by the abovementioned focus control unit 10, and which drives the focusing lens and the like contained in the abovementioned lens system 1, a noise estimating unit 13 constituting noise estimating means that performs noise estimation (as will be described in detail later) on the basis of the image data stored in the abovementioned image buffer 8, a noise reducing unit 12 constituting noise reducing means that performs noise reduction in the image data read out from the abovementioned image buffer 8 using the results of the estimation performed by the abovementioned noise estimating unit 13, a signal processing unit 14 which processes the image data output from the abovementioned noise reducing unit 12, an output unit 15 which outputs the image data from the abovementioned signal processing unit 14 in order to record this data on a memory card or the like, an external I/F unit 17 which has interfaces to the power supply switch, shutter button, mode switches that are used to switch between various shooting modes and the like, and a control unit 16 which constitutes control means comprising a microcomputer or the like that is connected bidirectionally to the abovementioned CDS unit 5, amplifier 6, A/D converter 7, exposure control unit 9, focus control unit 10, noise reducing unit 12, noise estimating unit 13, signal processing unit 14, output unit 15, and external I/F unit 17, so that this control unit comprehensively controls the image pickup system containing these parts, and which also constitutes parameter calculating means and shutter speed calculating means.

Next, the signal flow in an image pickup system such as that shown in FIG. 1 will be described.

The image pickup system is constructed such that the shooting conditions such as the ISO sensitivity and the like can be set via the external I/F unit 17. After these settings have been made, the pre-image-pickup mode is entered by half-pressing a shutter button formed by a two-stage press-button switch.

The video signal that is output by the CCD 4 via the abovementioned lens system 1, aperture 2 and low pass filter 3 is read out as an analog signal by universally known correlated double sampling in the CDS unit 5.

The analog signal is amplified by a specified amount by the amplifier 6, converted into a digital signal by the A/D converter 7, and transmitted to the image buffer 8.

The video signal inside the image buffer 8 is subsequently transmitted to the exposure control unit 9 and the focus control unit 10.

The exposure control unit 9 determines the brightness level in the image, and controls the aperture value of the aperture 2, the electronic shutter speed of the CCD 4, the amplification rate of the amplifier 6 and the like with the set ISO sensitivity, shutter speed in the limit of movement of the hands and the like being taken into account, so that an appropriate exposure is obtained.

Furthermore, the focus control unit 10 detects the edge intensity in the image, and obtains a focused image by controlling the AF motor 11 such that this edge intensity is maximized.

When preparations for the real shooting have been completed by performing such a pre-image-pickup mode, the) real shooting is then performed when it is detected via the external I/F unit 17 that the shutter button has been fully pressed.

The real shooting is performed on the basis of the exposure conditions determined by the exposure control unit 9 and the focusing conditions determined by the focus control unit 10. These shooting conditions are transmitted to the control unit 16.

When real shooting is thus performed, the video signal is transmitted to the image buffer 8 and stored in the same manner as in the case of pre-image-pickup.

The video signal inside the image buffer 8 is transmitted to the noise estimating unit 13; furthermore, shooting conditions such as the exposure conditions determined by the exposure control unit 9, the ISO sensitivity set by the external I/F unit 17 and the like are also transmitted to the noise estimating unit 13 via the control unit 16.

On the basis of the abovementioned information and video signal, the noise estimating unit 13 calculates the amount of noise in each unit of a specified size, e.g., in the present embodiment, in each pixel (i.e., in pixel units), and transmits the calculated amount of noise to the noise reducing unit 12. The calculation of the amount of noise in the noise estimating unit 13 is performed under the control of the control unit 16 in synchronization with the processing of the noise reducing unit 12.

On the basis of the amount of noise calculated by the noise estimating unit 13, the noise reducing unit 12 performs noise reduction processing on the video signal inside the image buffer 8, and transmits the video signal that has been subjected to this processing to the signal processing unit 14.

Under the control of the control unit 16, the signal processing unit 14 performs universally known emphasis processing, compression processing and the like on the video signal that has been subjected to noise reduction processing, and transmits the signal that has been subjected to this processing to the output unit 15.

The output unit 15 records and stores the received video signal on a memory card or the like.

Next, one example of the construction of the noise estimating unit 13 will be described with reference to FIG. 2.

The noise estimating unit 13 comprises: an OB region extraction unit 21 which extracts the signal of an OB (optical black) region arranged on the right side of the image region of the CCD 4 (as shown for example in FIG. 3A) from the video signal stored in the image buffer 8 under the control of the control unit 16; a first buffer 22 which stores the signal of the OB region extracted by the OB region extraction unit 21; a variance calculating unit 23 constituting variance calculating means which reads out the signal of the OB region stored in the abovementioned first buffer 22, calculates the variance value of this signal, and uses information relating to the exposure conditions transmitted from the abovementioned control unit 16 to perform a correction for the amount of amplification of the abovementioned amplifier 6 on this variance value; a ROM 25 used for temperature estimation constituting temperature estimating means in which the pre-measured relationship between the variance value and the temperature of the image pickup element is recorded; a temperature estimating unit 24 constituting temperature estimating means which comprises parameter calculating means that determines the temperature of the image pickup element on the basis of the variance value output from the abovementioned variance calculating unit 23 and information from the abovementioned ROM 25 used for temperature estimation; a local region extraction unit 26 constituting signal value calculating means that extracts local regions of a specified size in specified positions from the video signal stored in the abovementioned image buffer 8; a second buffer 27 which stores the signals of the local regions extracted by the abovementioned local region extraction unit 26; an average calculating unit 28 constituting signal value calculating means which comprises parameter calculating means that reads out the signals of the local regions stored in the abovementioned second buffer 27, calculates the average value of these signals, and outputs this average value as the signal value level of the pixel of interest; a gain calculating unit 29 constituting gain calculating means which comprises parameter calculating means that calculates the amount of amplification of the above-mentioned amplifier 6 on the basis of information relating to the exposure conditions (ISO sensitivity, exposure information, white balance information and the like) transmitted from the abovementioned control unit 16; a standard value assigning unit 30 constituting assigning means that provides standard values in cases where any of the parameters are omitted; a parameter ROM 32 constituting coefficient calculating means that store parameters relating to functions (described later) that are used to estimate the amount of noise; a coefficient calculating unit 31 constituting coefficient calculating means which comprises noise amount calculating means that estimates the amount of noise for the pixel of interest by means of a specified formula, on the basis of information relating to the parameters that are read out from the above-mentioned parameter ROM 32, the temperature of the image pickup element that is output from the abovementioned temperature estimating unit 24 or the abovementioned standard value assigning unit 30, the signal value level that is output from the above-mentioned average calculating unit 28 or the above-mentioned standard value assigning unit 30, the amount of amplification that is output from the abovementioned gain calculating unit 29 or the abovementioned standard value assigning unit 30, and the shutter speed that is output from the abovementioned control unit 16 or the above-mentioned standard value assigning unit 30; a function calculating unit 33 constituting function calculating means which comprises noise amount calculating means that calculate the amount of noise using functions formulized (as will be described later) by means of the coefficients output from the abovementioned coefficient calculating unit 31; and an upper limit setting unit 34 constituting upper limit value setting means that sets a limit and outputs this limit to the abovementioned noise reducing unit 12 such that the amount of noise that is output from the abovementioned function calculating unit 33 does not exceed a specified threshold value.

In the present embodiment, since the processing of the noise reducing unit 12 is separated in the horizontal direction and vertical direction (as will be described later), the abovementioned local region extraction unit 26 is devised such that extraction is performed while the overall image is successively scanned in (for example) 4×1 size units in the case of horizontal-direction processing, and in (for example) 1×4 size units in the case of vertical-direction processing. The processing performed by the local region extraction unit 26 is performed in synchronization with the processing of the noise reducing unit 12.

Furthermore, the upper limit setting unit 34 is provided in consideration of cases in which the reduction processing for the theoretical amount of noise becomes subjectively excessive. Specifically, in cases where the amount of noise is large, there may be instances in which the original signal is lost and a deterioration in the image quality is felt subjectively if this noise is completely eliminated. Accordingly, this unit is devised such that the preservation of the original signal is given priority, and the total image quality is increased, even if this means that noise components remain. Furthermore, the function of the upper limit setting unit 34 can also be stopped by the control unit 16 by operation from the external I/F unit 17.

Furthermore, the abovementioned control unit 16 is connected bidirectionally to the abovementioned OB region extraction unit 21, variance calculating unit 23, temperature estimating unit 24, local region extraction unit 26, average calculating unit 28, gain calculating unit 29, standard value assigning unit 30, coefficient calculating unit 31, function calculating unit 33, and upper limit setting unit 34, and controls these units.

The relationship between the variance of the OB region and the temperature of the image pickup element estimated in the above-mentioned temperature estimating unit 24 will be described with reference to FIG. 4.

As is shown in this figure, the temperature of the image pickup element rises in a monotonic increase while describing a curve as the variance of the OB region increases.

In the case of random noise in the OB region, in which there is no incident light, dark current noise is the governing factor, and this dark current noise is related to the temperature of the image pickup element.

Accordingly, the random noise of the OB region is calculated as a variance value, and the relationship between this variance value and the temperature variation of the image pickup element is measured beforehand and stored in the ROM 25 used for temperature estimation. As a result, the temperature estimating unit 24 can estimate the temperature of the CCD 4 (which is the image pickup element) from the variance value that is calculated by the variance calculating unit 23, using the corresponding relationship that is stored in the ROM 25 used for temperature estimation.

Furthermore, in the above description, it is considered that the temperature of the image pickup element is the same at all positions on the element, and only one temperature is determined. However, the present invention need not be limited to this; it would also be possible to construct this unit such that local temperatures at respective points on the element are determined.

For example, as is shown in FIG. 3B, it would also be possible to devise this unit such that OB regions are arranged on the four sides of the image region, variance values for the OB regions positioned respectively on the upper end, lower end, left end and right end are determined with respect to specified blocks in the image, and variance values for the specified blocks are determined by a linear interpolation of these variance values. As a result, a highly precise temperature estimation can be accomplished even in cases where the temperature of the image pickup element is non-uniform.

Next, the formulization of the amount of noise that is used when the amount of noise of the pixel of interest is estimated by the coefficient calculating unit 31 will be described with reference to FIGS. 5A and 5B.

The function of the amount of noise N with respect to the signal value level L is formulized as shown by the following equation (1).

$$N = AL^B + C \quad (1)$$

Here, A, B and C are constant terms, and a constant term is added to a function expressing a power of the signal value level L.

Figure 5B:
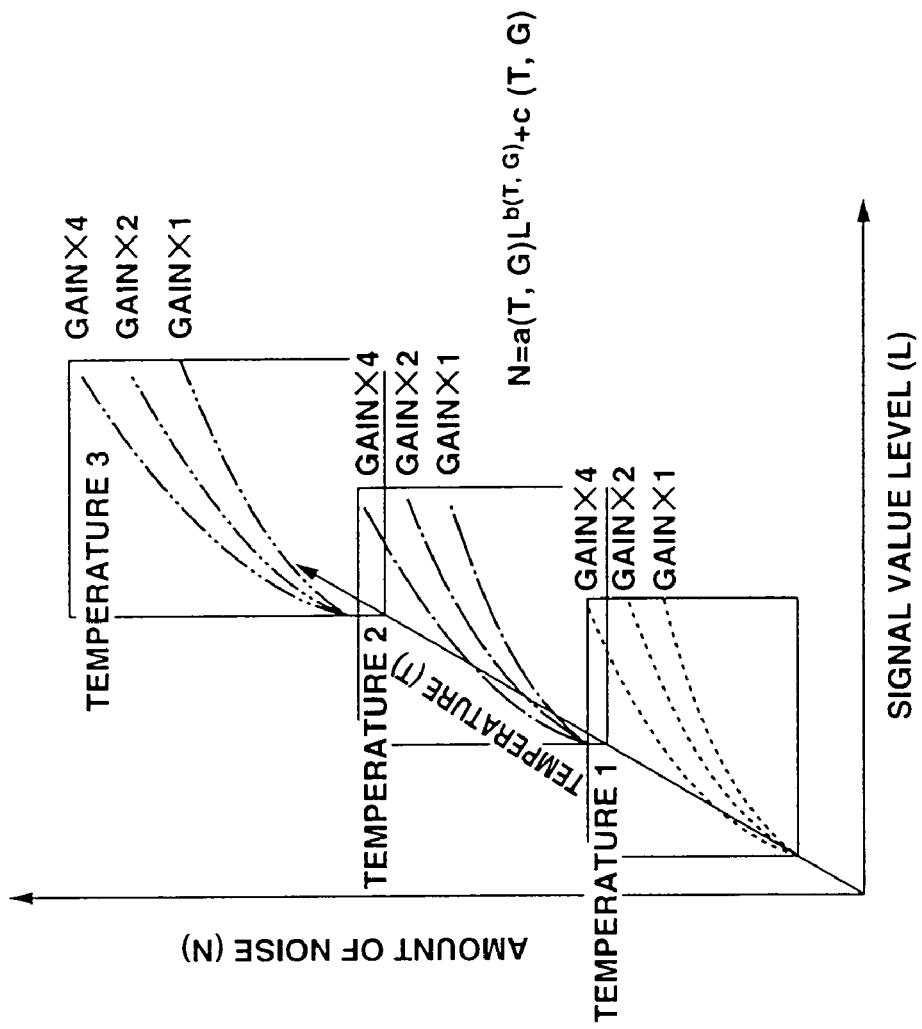
FIG. 5B is another graph which is used to illustrate the formulization of the amount of noise in the abovementioned first embodiment.
Figure 5A:
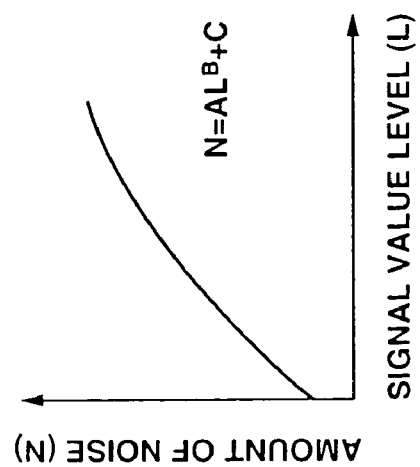
FIG. 5A is a graph which is used to illustrate the formulization of the amount of noise in the abovementioned first embodiment.

If the outline of this function in a case where (for example) A>0, 0<B<1 and C>0 is plotted, a shape such as that shown in FIG. 5A is obtained.

However, the amount of noise N does not depend on the signal value level L alone, but also varies according to the temperature of the CCD 4 which constitutes the image pickup element, and the gain of the amplifier 6. Accordingly, the example shown in FIG. 5B takes these factors into account.

Specifically, instead of A, B and C which are constant terms in the abovementioned equation (1), a(T, G), b(T, G) and c(T, G) which use the temperature T and gain G as parameters are introduced as shown in equation (2).

$$N = a(T,G)L^{b(T,G)} + c(T,G) \quad (2)$$

FIG. 5B shows how the curve indicated by this equation (2) is plotted in the case of a plurality of gains G (1, 2 and 4 times in the example shown in the figure) at a plurality of temperatures T (T1 through T3 in the example shown in the figure).

In FIG. 5B, an independent variable is expressed as the signal value level L, and a dependent variable is expressed as the amount of noise N. The temperature T which is used as a parameter is plotted as a coordinate axis in the direction perpendicular to these variables. Accordingly, the amount of noise N according to the signal value level L is read respectively within the plane expressed by T=T1, within the plane expressed by T=T2 and within the plane expressed by T=T3. In this case, the variation of the curve shape caused by the gain G (which is a parameter) is expressed by drawing a plurality of curves within the respective planes.

The individual curves indicated by the respective parameters have a configuration that is more or less similar to the curve produced by equation (1) as shown in FIG. 5A; however, the respective coefficients a, b and c naturally vary according to the respective values of the temperature T and gain G.

FIG. 6A shows an outline of the characteristics of the above-mentioned function a(T, G), FIG. 6B shows an outline of the abovementioned function b(T, G), and FIG. 6C shows an outline of the abovementioned function c(T, G).

Since these respective functions are two-variable functions with the temperature T and gain G as independent variables, FIGS. 6A through 6C are plotted as three-dimensional coordinates, and the plots of the functions form curved surfaces in these plotted spaces. Here, however, instead of showing the concrete shapes of the curved surfaces, the major variations in the characteristics are shown using curves.

As a result of the temperature T and gain G being input as parameters into such functions a, b, and c, the respective constants terms A, B and C are output. Furthermore, the concrete shapes of these functions can easily be acquired beforehand by measuring the characteristics of the image pickup element system including the CCD 4 and amplifier 6.

Random noise tends to increase as the exposure time becomes longer. Consequently, if the combination of shutter speed and aperture value differs, there may be a difference in the amount of noise that is generated, even if the amount of exposure is the same. Accordingly, an example in which a correction is performed with such differences being taken into account will be described with reference to FIG. 6D. Here, a correction coefficient d(S) which uses the shutter speed S as a parameter is introduced, and correction by a formulization of the type shown in equation (3) is performed by means of multiplying the equation (2) and this correction coefficient together.

$$N = \{a(T,G)L^{b(T,G)} + c(T,G)\}d(S) \quad (3)$$

The functional shape of this correction coefficient d(S) is obtained by measuring the characteristics of the image pickup element system beforehand. For example, this function has a shape such as that shown in FIG. 6D. FIG. 6D shows the increment D in the amount of noise for the shutter speed S.

As is shown in FIG. 6D, the increment D in the amount of noise has the property of increasing abruptly when the shutter speed S is smaller than a certain threshold value $S^{TH}$ (i.e., when the exposure time is long). Accordingly, two different procedures are used according to whether the shutter speed S is higher or lower than this threshold value $S^{TH}$; the function d(S) is used in the case of a long exposure time, but the procedure may be simplified such that a fixed coefficient is used in the case of a short exposure time.

The four (4) functions a(T, G), b(T, G), c(T, G) and d(S) mentioned above are stored in the abovementioned parameter ROM 32. Furthermore, the correction for the shutter speed need not always be prepared as a function, but may also be prepared as some other means, e.g., as a table or the like.

The coefficient calculating unit 31 calculates the respective coefficients A, B, C and D using the four functions stored in the parameter ROM 32, taking as parameters the temperature T, gain G and shutter speed S that are dynamically acquired (or acquired from the standard value assigning unit 30).

The function calculating unit 33 determines the functional shapes used to calculate the amount of noise N by applying the respective coefficients A, B, C and D calculated by the abovementioned coefficient calculating unit 31 to the abovementioned equation (3); this unit calculates the amount of noise N according to the signal value level L that is output from the abovementioned average calculating unit 28 via the abovementioned coefficient calculating unit 31.

In this case, the respective parameters such as the temperature T, gain G, shutter speed S and the like need not always be determined for each shooting. For examples, since the temperature T stabilizes after a fixed period of time has elapsed following the switching on of the power supply, it would also be possible for the control unit 16 to store temperature information calculated in the temperature estimating unit 24 following this stabilization in the standard value assigning unit 30, and to omit the subsequent calculation process so that temperature information read out from the standard value assigning unit 30 is used. Thus, in cases where parameters from the temperature estimating unit 24, average calculating unit 28, gain calculating unit 29, control unit 16 and the like are not obtained, the standard value assigning unit 30 sets and outputs standard parameters; as a result, the speed of the processing can be increased, and power can be saved. Furthermore, the standard value assigning unit 30 can also output standard values for other required parameters.

Next, one example of the construction of the noise reducing unit 12 will be described with reference to FIG. 7.

The noise reducing unit 12 comprises: a horizontal line extraction unit 41 which successively extracts video signals in units of horizontal line from the abovementioned image buffer 8; a first smoothing unit 42 constituting smoothing means that scans the image signals of the horizontal lines extracted by the abovementioned horizontal line extraction unit 41 in pixel units and perform universally known hysteresis smoothing with the threshold value from a threshold value setting unit 46 (described later) as the amount of noise; a buffer 43 which stores the video signal for one screen by successively storing the horizontal lines that have been smoothed by the abovementioned first smoothing unit 42; a vertical line extraction unit 44 which successively extracts video signals in units of vertical line from the abovementioned buffer 43 after a video signal corresponding to one screen has been accumulated in the buffer 43; a second smoothing unit 45 constituting smoothing means that scans the image signals of the vertical lines extracted by the abovementioned vertical line extraction unit 44 in pixel units, performs universally known hysteresis smoothing with the threshold value from the threshold value setting unit 46 (described later) as the amount of noise, and successively outputs the signals to the abovementioned signal processing unit 14; and a threshold value setting unit 46 constituting threshold value setting means that acquires the amount of noise estimated by the abovementioned noise estimating unit 13 in pixel units in accordance with the horizontal lines extracted by the abovementioned horizontal line extraction unit 41 or the vertical lines extracted by the abovementioned vertical line extracting unit 44, sets the amplitude value of the noise as a threshold value (minimum amplitude value), and outputs this value to the abovementioned first smoothing unit 42 or the abovementioned second smoothing unit 45.

Here, the hysteresis smoothing performed in the abovementioned first and second smoothing units 42 and 45 is performed under the control of the control unit 16 in synchronization with the operation of the noise estimating unit 13 and the operation of the threshold setting unit 46.

Furthermore, the abovementioned control unit 16 is connected bidirectionally to the abovementioned horizontal line extraction unit 41, vertical line extraction unit 44 and threshold value setting unit 46, and controls these units. Moreover, in the above description, the amount of noise is estimated in pixel units. However, the present invention is not limited to this; it would also be possible to devise the unit such that the amount of noise is estimated for each arbitrary specified unit area such as (for example) 2×2 pixels, 4×4 pixels or the like. In such a case, the precision of noise estimation drops; on the other hand, this is advantageous in that higher-speed processing is possible.

In the first embodiment, the amount of noise is estimated for each pixel or each unit area, and noise reduction processing is performed in accordance with local amounts of noise; accordingly, optical noise reduction is possible in light areas and dark areas, so that a higher-quality image can be obtained.

Furthermore, the respective parameters relating to the amount of noise are dynamically determined for each shooting, and the amount of noise is calculated from these parameters; accordingly, this can be dynamically applied to different conditions for each shooting, so that high-precision estimation of the amount of noise is possible.

Furthermore, the amount of noise is set as a threshold value, and signals that are equal to or less than this threshold value are excluded; accordingly, signals that exceed the threshold value are preserved as original signals, so that a high-quality image in which there is no deterioration of the edge portions, and in which only noise is reduced, can be obtained.

Moreover, the calculated amount of noise is limited such that this amount does not exceed a specified upper-limit value; accordingly, excessive noise reduction processing can be prevented, so that preservation of the edge portions of the original signal can be ensured. In this case, the setting or non-setting of such an upper-limit value can be accomplished by the operation of the device, so that an approach that produces a subjectively better image quality can be selected.

In addition, the signal level of the pixel of interest is acquired by averaging in the region surrounding the pixel of interest; accordingly, the effects of the noise components can be reduced, and high-precision estimation of the amount of noise is possible.

Furthermore, the temperature of the abovementioned image pickup element is estimated from the variance value of the OB region of the image pickup element, and is used as a parameter for the estimation of the amount of noise; accordingly, the amount of noise can be estimated with high precision in dynamic response to variations in temperature during shooting. In this case, since the OB region is utilized, a low-cost image pickup system can be realized.

The amount of gain during shooting is determined on the basis of the ISO sensitivity, exposure information and white balance information, and is used as a parameter in the estimation of the amount of noise; accordingly, the amount of noise can be estimated with high precision in dynamic response to variations in the gain during shooting.

The amount of correction for noise is determined in accordance with the shutter speed used; accordingly, the amount of noise can also be estimated with high precision even in the case of noise that increases during long-term exposure, in dynamic response to the shutter speed during shooting.

Standard values are set for parameters that are not obtained during shooting; furthermore, coefficients for the calculation of the amount of noise are determined together with the parameters that are obtained, and the amount of noise is calculated from these coefficients. Accordingly, the amount of noise can be estimated even in cases where the necessary parameters are not obtained during shooting, so that a stable noise reducing effect can be obtained. Furthermore, since functions are used in the calculation of the amount of noise, the required amount of memory is small, so that costs can be reduced. Moreover, by intentionally omitting some of the parameter calculations, it is possible to reduce costs and save power.

Thus, in the present embodiment, even if the factors that affect the amount of noise vary dynamically, the amount of noise can be appropriately reduced in accordance with these varying factors, so that a high-quality image can be obtained.

Figure 8:
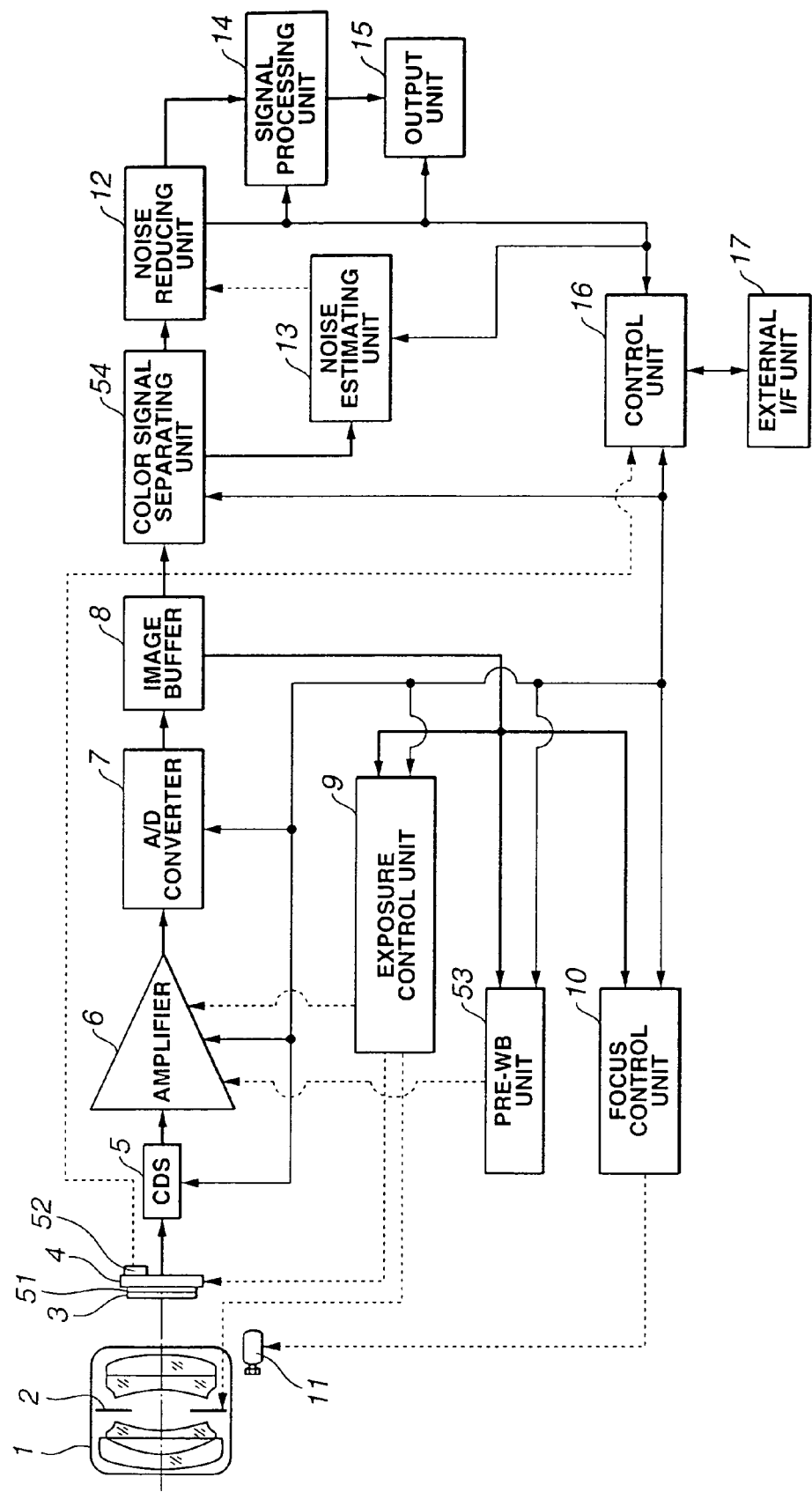
FIG. 8 is a block diagram which shows the construction of the image pickup system in a second embodiment of the present invention.
Figure 10:
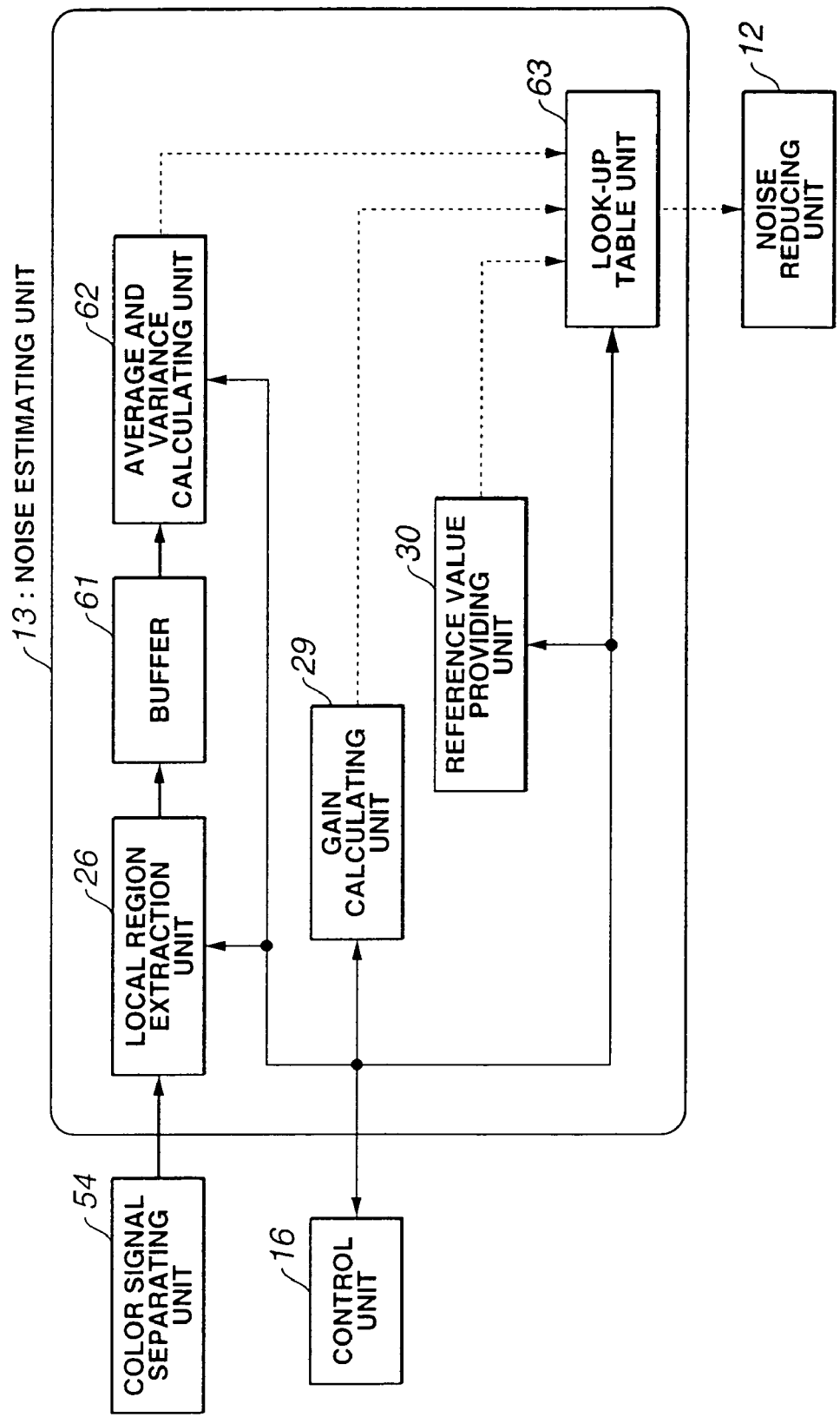
FIG. 10 is a block diagram which shows the construction of the noise estimating unit in the abovementioned second embodiment.
Figure 11:
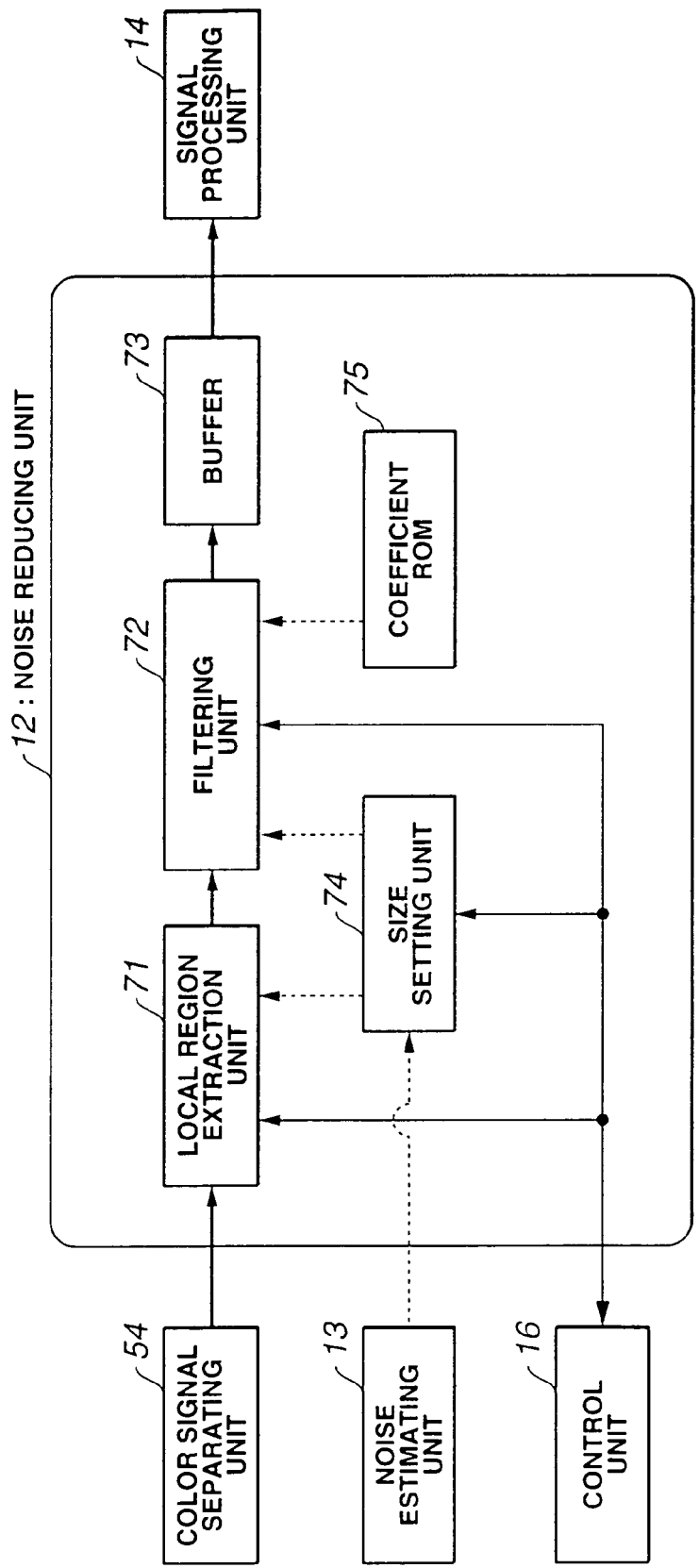
FIG. 11 is a block diagram which shows the construction of the noise reducing unit in the abovementioned second embodiment.

FIGS. 8 through 12 show a second embodiment of the present invention. FIG. 8 is a block diagram which shows the construction of the image pickup system, FIG. 9 is a diagram which shows the primary color Bayer type filter construction in the color filters, FIG. 10 is a block diagram which shows the construction of the noise estimating unit, FIG. 11 is a block diagram which shows the construction of the noise reducing unit, and FIG. 12 is a flow chart which shows the noise reduction processing that is performed by the image processing program in the computer.

In the second embodiment, parts that are the same as in the abovementioned first embodiment are labeled with the same symbols, and a description of these parts is omitted. For the most part, only the points that are different are described.

As is shown in FIG. 8, the image pickup system of the second embodiment comprises (in addition to the construction of the abovementioned first embodiment) primary color Bayer type, for example, color filters 51 that are arranged at the front of the abovementioned CCD 4, a temperature sensor 52 which is arranged in the vicinity of the abovementioned CCD 4, and which constitutes parameter calculating means used to measure the temperature of the abovementioned CCD 4 in real time, and to output the measurement results to the abovementioned control unit 16, a pre-WB unit 53 which performs a simple white balance detection on the basis of the video signal stored in the abovementioned image buffer 8, and controls the above-mentioned amplifier 6 on the basis of the detection results, and a color signal separating unit 54 constituting separating means that read out the video signals stored in the abovementioned image buffer 8, separate the color signals, and output these signals to the abovementioned noise reducing unit 12 and the abovementioned noise estimating unit 13. The pre-WB unit 53 and color signal separating unit 54 are connected to the abovementioned control unit 16 bidirectionally, and are controlled by the control unit 16.

The flow of signals in the image pickup system shown in the FIG. 8 is basically similar to that in the first embodiment; only the portions that are different will be described.

When the pre-image-pickup mode is entered by half-pressing the shutter button, the subject image is picked up by the CCD 4 via the color filters 51, and the image-captured subject is output as a video signal.

The video signal is subjected to the processing described in the first embodiment, and is stored in the image buffer 8 as a digital video signal. The video signal stored in the image buffer 8 is transmitted to the abovementioned exposure control unit 9 and focus control unit 10, and is also transmitted to the pre-WB unit 53.

The pre-WB unit 53 calculates simple white balance coefficients by multiplying each color signal by a signal with a specified brightness level in the video signal, and transmits these coefficients to the amplifier 6.

The amplifier 6 performs a white balance adjustment by multiplying each color signal by a different gain using the simple white balance coefficients received from the pre-WB unit 53.

Next, when it is detected that the shutter button has been fully pressed, a real shooting operation is performed on the basis of the exposure conditions determined by the exposure control unit 9, the focus conditions determined by the focus control unit 10 and the white balance coefficients determined by the pre-WB unit 53, and these shooting conditions are transmitted to the control unit 16.

The video signal acquired by this real shooting operation is stored in the image buffer 8, and is then transmitted to the color signal separating unit 54 and separated into each color of the color filters.

As is described above, the filter construction of the abovementioned color filters 51 arranged at the front of the CCD 4 is, for example, a primary color Bayer type construction as shown in FIG. 9; specifically, the basic unit is 2×2 pixels, with green (G1, G2) filters being arranged in diagonal positions, and red (R) and blue (B) filters being arranged in the remaining diagonal positions. Furthermore, the green filters G1 and G2 are filters with the same optical characteristics; here, however, these filters are distinguished as G1 and G2 for convenience.

The color signal separating unit 54 is devised such that this unit separates the video signal inside the image buffer 8 according to these four types of color filters R, G1, G2 and B. This separating operation is performed under the control of the control unit 16 in synchronization with the processing of the noise reducing unit 12 and the processing of the noise estimating unit 13.

The respective color signals separated by the color signal separating unit 54 are transmitted to the noise estimating unit 13, where estimation of the amount of noise is performed as described above. Using the results of this estimation, noise reduction processing is performed in the noise reducing unit 12, and the respective processed color signals are synthesized and transmitted to the signal processing unit 14. The subsequent operations are the same as in the abovementioned first embodiment.

Next, one example of the construction of the noise estimating unit 13 in the present embodiment will be described with reference to FIG. 10.

The basic construction of the noise estimating unit 13 is similar to that of the noise estimating unit shown in FIG. 2 in the abovementioned first embodiment; constituent elements that have the same function are designated by the same names and labeled with the same symbols.

The noise estimating unit 13 comprises a local region extraction unit 26 which extracts a local region of a specified size in a specified position for each color signal output from the abovementioned color signal separating unit 54, a buffer 61 which stores the color signals of the local regions extracted by the abovementioned local region extraction unit 26, a gain calculating unit 29 which calculates the amount of amplification of the abovementioned amplifier 6 on the basis of information relating to the exposure conditions and information relating to the white balance coefficients transmitted from the abovementioned control unit 16, a standard value assigning unit 30 which provides standard values in cases where any of the parameters are omitted, an average and variance calculating unit 62 which reads out the signals in the abovementioned buffer 61, calculates the average value and variance value, transmits the calculated average value to the look-up table unit 63 as the signal value level of the pixel of interest, and transmits the variance value to the control unit 16 to use as a control parameter by the noise reducing unit 12, and a look-up table unit 63 constituting look-up table means which is noise amount calculating means in which the relationships between the amount of noise and the shutter speed output from the abovementioned control unit 16 or standard value assigning unit 30, information relating to the temperature of the image pickup element output from the abovementioned temperature sensor 52 or standard value assigning unit 30, amount of amplification from the abovementioned gain calculating unit 29 or standard value assigning unit 30, and signal value level output from the abovementioned average and variance calculating unit 62 or standard value assigning unit 30 are constructed by means similar to those used in the abovementioned first embodiment and recorded as a look-up table.

The amount of noise thus obtained by the look-up table 63 is transmitted to the noise reducing unit 12.

Furthermore, the processing of the abovementioned local region extraction unit 26 is performed in synchronization with the processing of the above-mentioned noise reducing unit 12, and the processing of the noise reducing unit 12 (described later) is performed in block units; accordingly, in the present embodiment, extraction is performed while the entire image is successively scanned, for example, in units of 4×4 pixels.

Furthermore, the abovementioned control unit 16 is connected bidirectionally with the abovementioned local region extraction unit 26, average and variance calculating unit 62, gain calculating unit 29, standard value assigning unit 30 and look-up table unit 63, and controls these units.

Next, one example of the construction of the noise reducing unit 12 will be described with reference to FIG. 11.

The noise reducing unit 12 comprises a size setting unit 74 constituting control value setting means that sets the filter size on the basis of the amount of noise estimated by the abovementioned noise estimating unit 13, a local region extraction unit 71 which extracts pixel blocks corresponding to the filter size set by the abovementioned size setting unit 74 from the respective color signals output from the abovementioned color signal separating unit 54 such that these blocks encompass the pixel of interest (e.g., such that these blocks are centered on the pixel of interest), a coefficient ROM 75 constituting smoothing means in which coefficients corresponding to a preset filter size are recorded, a filtering unit 72 constituting smoothing means that reads in the coefficients of the corresponding filter size from the above-mentioned coefficient ROM 75 on the basis of the filter size set by the abovementioned size setting unit 74, and performs filtering processing to apply universally known smoothing to the pixel blocks extracted by the abovementioned local region extraction unit 71, and a buffer 73 which stores the respective color signals subjected to filtering processing that are output from the abovementioned filtering unit 72 for all colors such that these signals correspond to the signal output positions of the CCD 4.

The abovementioned size setting unit 74 makes a selection from filter sizes of, for example, 1×1 pixels to 9×9 pixels in accordance with the amount of noise estimated by the noise estimating unit 13, such that a small size is selected when the amount of noise is small, and a large size is selected when the amount of noise is large. This filter size is a control value for controlling the frequency characteristics of the smoothing processing; as a result, filtering processing (smoothing processing) that reduces a specified frequency band in the video signal is performed in accordance with the frequency characteristics of the noise.

Furthermore, the abovementioned size setting unit 74 is devised such that this unit receives variance value information relating to the signal value level in the vicinity of the pixel of interest from the control unit 16, discriminates that the pixel of interest constitutes a flat region in cases where this variance value is small, and that the pixel of interest constitutes an edge region in cases where this variance value is large, and, on the basis of the discrimination results, does not perform any correction of the filter size in cases where the pixel of interest constitutes a flat region, and corrects the filter size to a smaller size in cases where the pixel of interest constitutes an edge region.

Furthermore, filtering processing is performed for all colors by repeating the abovementioned processing for each of the respective color signals, and the respective color signals stored in the buffer 73 are subsequently read out and processed by the abovementioned signal processing unit 14.

Furthermore, the abovementioned control unit 16 is connected bidirectionally to the abovementioned local region extraction unit 71, filtering unit 72 and size setting unit 74, and controls these units.

In addition, in the above description, it is assumed that processing is performed by means of hardware. However, the present invention is not limited to this; processing may also be performed by means of software.

For example, it would also be possible to devise the system such that the video signals output from the CCD 4 are taken as raw data in an unprocessed state, and such that information such as the temperature during shooting, gain, shutter speed and the like from the abovementioned control unit 16 are added to this raw data as header information. It would also be possible to output the raw data to which this header information has been added to a processing device such as a computer or the like, and to process this data by means of software in this processing device.

An example in which noise reduction processing is performed by means of an image processing program in a computer will be described with reference to FIG. 12.

When the processing is started, all color signals constituting the raw data, as well as header information such as the temperature, gain, shutter speed and the like, are first read in (step S1).

Next, the raw data is separated into respective color signals (step S2), and scanning is performed individually for each color signal (step S3).

Then, local regions of a specified size which are, for example, in units of 4×4 pixels centered on the pixel of interest are extracted (step S4).

The average value which is the signal value level of the pixel of interest, and the variance value which is used to discriminate between a flat region and an edge region, are calculated for the extracted local regions (step S5).

Next, parameters such as the temperature, gain, shutter speed and the like are determined from the header information that has been read in. Here, in cases where necessary parameters are not included in the header information, specified standard values are assigned (step S6).

The amount of noise is calculated (step S7) using the look-up table on the basis of the signal value level calculated in the abovementioned step S5 and the temperature, gain, shutter speed and the like constituting the parameters that are set in the abovementioned step S6.

Next, the filtering size is determined (step S8) on the basis of the variance value calculated in the abovementioned step S5 and the amount of noise calculated in the abovementioned step S7.

A region corresponding to the filtering size determined in the abovementioned step S8 is then extracted such that this region is centered on the pixel of interest (step S9).

Next, coefficients corresponding to the filtering size determined in the abovementioned step S8 are read in (step S10).

Smoothing filtering processing is then performed on the region extracted in the abovementioned step S9 using the filtering size determined in the abovementioned step S8 and the coefficients determined in the abovementioned step S10 (step S11).

Then, the smoothed signals are successively read out (step S12), a judgment is made as to whether or not scanning of the entire signal has been completed for one color (step S13). In cases where this scanning has not been completed, the processing returns to step S3, and the abovementioned processing is performed until the scanning is completed.

On the other hand, in cases where it is judged that the signal scanning has been completed in the abovementioned step S13, a further judgment is made as to whether or not processing has been completed for the color signals of all colors (step S14). In cases where processing has still not been completed for the color signals of all colors, the processing returns to step S2, and the abovementioned processing is performed. On the other hand, in cases where this processing has been completed, the processing is ended.

Furthermore, in the above description, a case in which the color filters 51 are primary color Bayer type filters is described as an example. However, the present invention is not limited to this. For example, it would also be possible to use the present invention in a similar manner in a case where the color filters are complementary color filters; furthermore, it would also be possible to use the present invention in the case of a two CCD or three CCD.

In the abovementioned second embodiment, an effect more or less similar to that of the abovementioned first embodiment can be obtained. Furthermore, since signals from an image pickup element that has color filters are separated into color signals for each color filter, and since the amount of noise is estimated for each pixel unit or unit area, and noise reduction processing suited to local amounts of noise is performed, optimal noise reduction can be performed from light areas to dark areas, so that a high-quality image can be obtained. Furthermore, the present invention can be used in various types of image pickup systems such as primary color or complementary color systems, and single CCD, two CCD or three CCD systems or the like.

Furthermore, since a filter size corresponding to the amount of noise is selected, and noise reduction processing is performed using this filter size, only the noise components are removed, and the remaining signal is preserved as the original signal, so that a high-quality image in which noise alone has been reduced can be obtained.

Furthermore, since the temperature of the image pickup element during shooting is directly measured in real time and used as a parameter for the estimation of the amount of noise, the amount of noise can be estimated with high precision in dynamic response to temperature variations during shooting.

In addition, since standard values are set for parameters not obtained during shooting, and the amount of noise is calculated from a look-up table together with the obtained parameters, the amount of noise can be estimated even in cases where necessary parameters cannot be obtained during shooting, so that a stable noise reduction effect can be obtained. Furthermore, since a table is used for the calculation of the amount of noise, high-speed processing is possible. Moreover, a reduction in cost and a saving of power can be achieved by intentionally omitting some of the parameter calculations.

In the present embodiment, even if factors that affect the amount of noise in a color CCD vary dynamically, the amount of noise can be appropriately reduced in response to these varying factors, so that a high-quality image can be obtained.

Furthermore, the present invention is not limited to the above-mentioned embodiments; it goes without saying that various modifications and applications are possible within limits that involve no departure from the spirit of the invention.

As is described above, the image pickup system and image processing program of the present invention make it possible to achieve an appropriate reduction of noise in the image, so that a high-quality image can be obtained.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. An image pickup system comprising:
noise estimating means comprising:
parameter calculating means for calculating parameters of a function using the signal value level of digitized signals from an image pickup element in which a plurality of pixels are arranged, and at least one type of information selected from, the temperature of the image pickup element, the gain for the signals and the shutter speed during shooting;
noise amount calculating means for calculating an amount of noise (N) contained in the signals, for one of each pixel and each specified area comprising a plurality of pixels responsive to the parameters calculated by the parameter calculating means; and
noise reducing means for reducing the noise contained in the signals on the basis of the amount of noise calculated by the noise calculating means.

2. The image pickup system according to claim 1, the noise amount calculating means employing said function which derives a noise amount according to said signal level.

3. The image pickup system according to claim 1, wherein the noise estimating means comprises an upper limit value setting means for setting an upper limit value on the estimated amount of noise.

4. The image pickup system according to claim 1, wherein the noise reducing means comprises:
threshold value setting means for setting an amplitude value of the noise as a threshold value for each pixel or for each specified unit area comprising a plurality of pixels on the basis of the amount of noise estimated by the noise estimating means; and
smoothing means for excluding the amplitude components in the signals which are below the threshold value set by the threshold value setting means.

5. The image pickup system according to claim 1, wherein the parameter calculating means comprises signal value calculating means for calculating the signal value levels by averaging a plurality of pixel values in a nearby region of a specified size or in the unit area that includes the pixel of interest.

6. The image pickup system according to claim 1, wherein the image pickup element comprises an OB (optical black) region, and the parameter calculating means comprises:
variance calculating means for calculating the variance of the signals in the OB region; and
temperature estimating means for estimating the temperature of the image pickup element on the basis of the variance calculated by the variance calculating means.

7. The image pickup system according to claim 1, wherein the parameter calculating means comprises gain calculating means for determining the gain on the basis of at least one type of information selected among the ISO sensitivity, exposure information and white balance information.

8. The image pickup system according to claim 1, wherein the parameter calculating means comprises shutter speed calculating means for determining the shutter speed during the shooting from exposure information.

9. The image pickup system according to claim 1, wherein the noise amount calculating means calculates the amount of noise N using the signal value level L of the signals, the temperature T of the image pickup element, the gain G for the signals and the shutter speed S during shooting as parameters, and the noise amount calculating means comprises:
coefficient calculating means for calculating four coefficients A, B, C and D on the basis of three functions a(T, G), b(T, G) and c(T, G) using the temperature T and gain G as parameters, and a function d(S) using the shutter speed S as a parameter; and
function calculating means for calculating the amount of noise N on the basis of a functional equation $$N=(AL^B+C)D$$

defined by the four coefficients A, B, C and D calculated by the coefficient calculating means.

10. The image pickup system according to claim 9, wherein the noise amount calculating means further comprises assigning means for assigning standard parameter values, and the parameters are values calculated by the parameter calculating means, or standard values assigned by the assigning means.

11. An image pickup system comprising:
a noise estimating unit comprising:
a parameter calculating unit for calculating parameters of a function using the signal value level of digitized signals from an image pickup element in which a plurality of pixels are arranged, and at least one type of information selected from, the temperature of the image pickup element, the gain for the signals and the shutter speed during shooting;
a noise amount calculating unit for calculating an amount of noise (N) contained in the signals, for one of each pixel and each specified area comprising a plurality of pixels responsive to the parameters calculated by the parameter calculating unit; and
a noise reducing unit for reducing the noise contained in the signals on the basis of the amount of noise calculated by the noise calculating unit.

12. The image pickup system according to claim 11, the noise amount calculating unit employing said function which derives a noise amount according to said signal level.

13. The image pickup system according to claim 11, wherein the noise estimating unit comprises an upper limit value setting unit for setting an upper limit value on the estimated amount of noise.

14. The image pickup system according to claim 11, wherein the noise reducing unit comprises:
a threshold value setting unit for setting an amplitude value of the noise as a threshold value for each pixel or for each specified unit area comprising a plurality of pixels on the basis of the amount of noise estimated by the noise estimating unit; and
a smoothing unit for excluding the amplitude components in the signals which are below the threshold value set by the threshold value setting unit.

15. The image pickup system according to claim 11, wherein the parameter calculating unit comprises a signal value calculating unit for calculating the signal value levels by averaging a plurality of pixel values in a nearby region of a specified size or in the unit area that includes the pixel of interest.

16. The image pickup system according to claim 11, wherein the image pickup element comprises an OB (optical black) region, and the parameter calculating unit comprises:
a variance calculating unit for calculating the variance of the signals in the OB region; and
a temperature estimating unit for estimating the temperature of the image pickup element on the basis of the variance calculated by the variance calculating unit.

17. The image pickup system according to claim 11, wherein the parameter calculating unit comprises a gain calculating unit for determining the gain on the basis of at least one type of information selected among the ISO sensitivity, exposure information and white balance information.

18. The image pickup system according to claim 11, wherein the parameter calculating unit further comprises a shutter speed calculating unit for determining the shutter speed during the shooting from exposure information.

19. The image pickup system according to claim 11, wherein the noise amount calculating unit calculates the amount of noise N using the signal value level L of the signals, the temperature T of the image pickup element, the gain G for the signals and the shutter speed S during shooting as parameters, and the noise amount calculating unit comprises:
a coefficient calculating unit for calculating four coefficients A, B, C and D on the basis of three functions a(T, G), b(T, G) and c(T, G) using the temperature T and gain G as parameters, and a function d(S) using the shutter speed S as a parameter; and
a function calculating unit for calculating the amount of noise N on the basis of a functional equation $$N=(AL^B+C)D$$

defined by the four coefficients A, B, C and D calculated by the coefficient calculating unit.

20. The image pickup system according to claim 19, wherein the noise amount calculating unit further comprises an assigning unit for assigning standard parameter values, and the parameters are values calculated by the parameter calculating unit, or standard values assigned by the assigning unit.

21. An image processing method comprising:
obtaining digitized signals representing an image of an object captured by an image pickup system having an array of pixels for converting the image into said digitized signals;
estimating an amount of noise contained in the digitized signals from one of each pixel and for a specified unit area of the image pickup element comprising a plurality of pixels;

setting an amplitude value of the noise as a threshold value for one of each pixel and the specified unit area based on the estimated amount of noise; and excluding the amplitude components in the signals that are equal to or less than the threshold value set by the threshold value setting routine to thereby obtain a high-quality image.

22. An image processing method, comprising:

obtaining digitized signals representing an image of an object captured by an image pickup element of an image pick system having an array of pixels for converting the image into said digitized signals;

obtaining a signal variance in optical black (OB) regions of digitized signals from the image pickup element in the image pickup system in which a plurality of pixels are arranged and which has an OB region;

estimating a temperature of the image pickup element based on the signal variance;

obtaining parameters based on at least one type of information selected from among the estimated temperature of the image pickup element, a signal value level of the digitized signals, a gain for the digitized signals and a shutter speed during shooting of a shutter in the pickup system;

determining an amount of noise estimated to be contained in the digitized signals based on said parameters, for one of each pixel in the array and a specified unit area of the image pickup element comprising a given plurality of pixels; and reducing the estimated noise in the digitized signals based on the amount of noise to thereby obtain a high-quality image.

23. An image processing method, comprising:

obtaining digitized signals representing an image of an object captured by an image pickup element of an image pickup system having an array of pixels for converting the image into said digitized signals;

determining a signal value level L of said digitized signals from the image pickup element in the pickup system in which a plurality of pixels are arranged, based on a temperature T of the image pickup element, a gain G for the signals and a shutter speed S of a shutter in the image pickup system and obtained during shootings as parameters;

determining four coefficients A, B, C and D based on three functions a(T, G), b(T, G) and c(T, G) using the temperature T and gain G as parameters, and a function d(S) using the shutter speed S as a parameter;

determining an amount of noise N estimated to be contained in the signals employing a functional equation $$N=(AL^B+C)D$$

defined by the aforesaid four coefficients A, B, C and D for one of each pixel in the pixel array and for a specified unit area of the image pickup element comprising a given plurality of pixels; and reducing the noise in the signals based on the determined amount of noise to thereby provide a high-quality image.

* * * * *